United States Patent [19]

Kidena et al.

[11] Patent Number: 4,485,432
[45] Date of Patent: Nov. 27, 1984

[54] ELECTRONIC VOLTAGE DROP CIRCUIT

[75] Inventors: Masaki Kidena, Yokohama; Akihiro Nishizuka, Tokyo, both of Japan

[73] Assignee: Tokyo Shibaura Denki Kabushiki Kaisha, Japan

[21] Appl. No.: 409,614

[22] Filed: Aug. 19, 1982

[30] Foreign Application Priority Data

Aug. 27, 1981 [JP] Japan .................. 56-134658

[51] Int. Cl.³ .................. H02M 3/06
[52] U.S. Cl. .................. 363/62; 368/204
[58] Field of Search .......... 363/62; 368/204; 307/41, 110

[56] References Cited

U.S. PATENT DOCUMENTS

| | | | |
|---|---|---|---|
| 4,205,369 | 5/1980 | Asano | 363/62 |
| 4,308,609 | 12/1981 | Tamaki | 363/62 |
| 4,395,138 | 7/1983 | Chihara | 368/204 |
| 4,404,624 | 9/1983 | Yamazaki | 363/62 |

FOREIGN PATENT DOCUMENTS 29-50948 6/1981 Fed. Rep. of Germany.
53-101616 9/1978 Japan.

OTHER PUBLICATIONS

Patents Abstracts of Japan, vol. 5, No. 15 (E-43) (687), Jan. 29, 1981 concerning Japanese Patent Document 55-144772, dated Nov. 11, 1980.

*Primary Examiner*—William H. Beha, Jr.
*Attorney, Agent, or Firm*—Finnegan, Henderson, Farabow, Garrett & Dunner

[57] ABSTRACT

An electronic circuit, having a load circuit driven by a battery, includes a voltage drop circuit to provide a constant dropped voltage even when the battery weakens and the load is activated. During load circuit activation, the dropped voltage is provided by two capacitors in the voltage drop circuit which are charged only during the non-drive period of the load circuit.

6 Claims, 15 Drawing Figures

F I G. 1
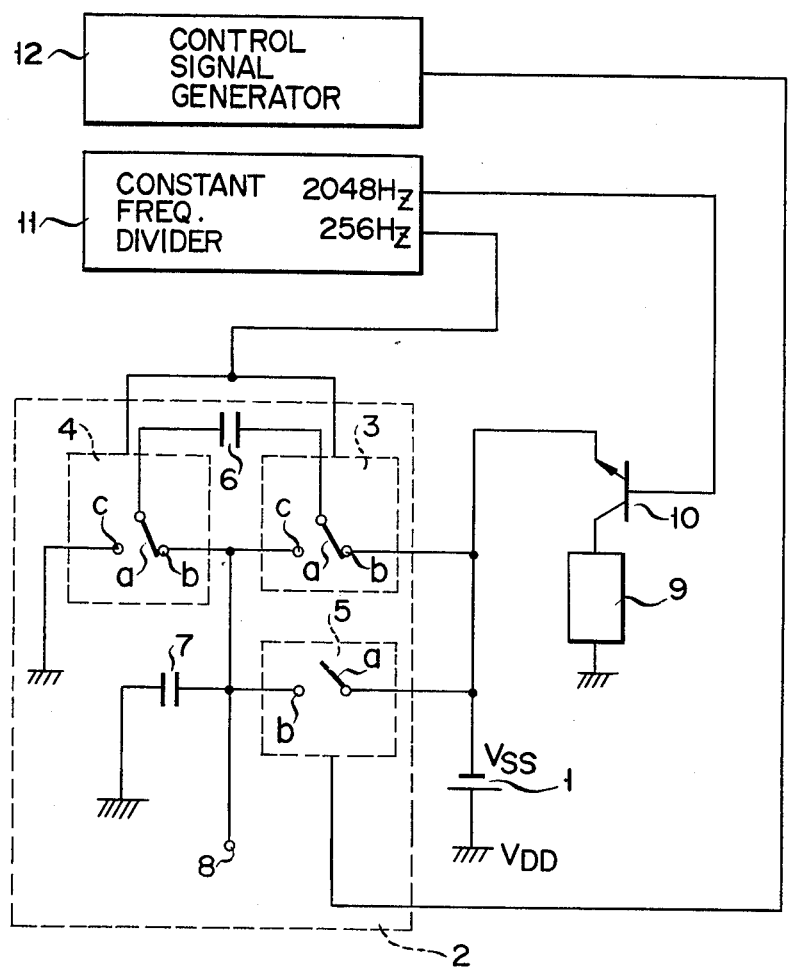
F I G. 2A
F I G. 2B
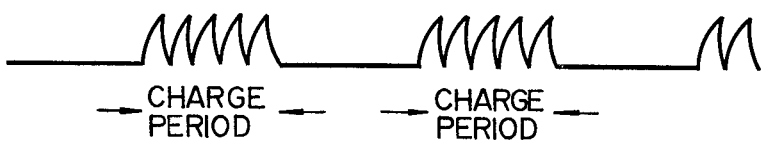

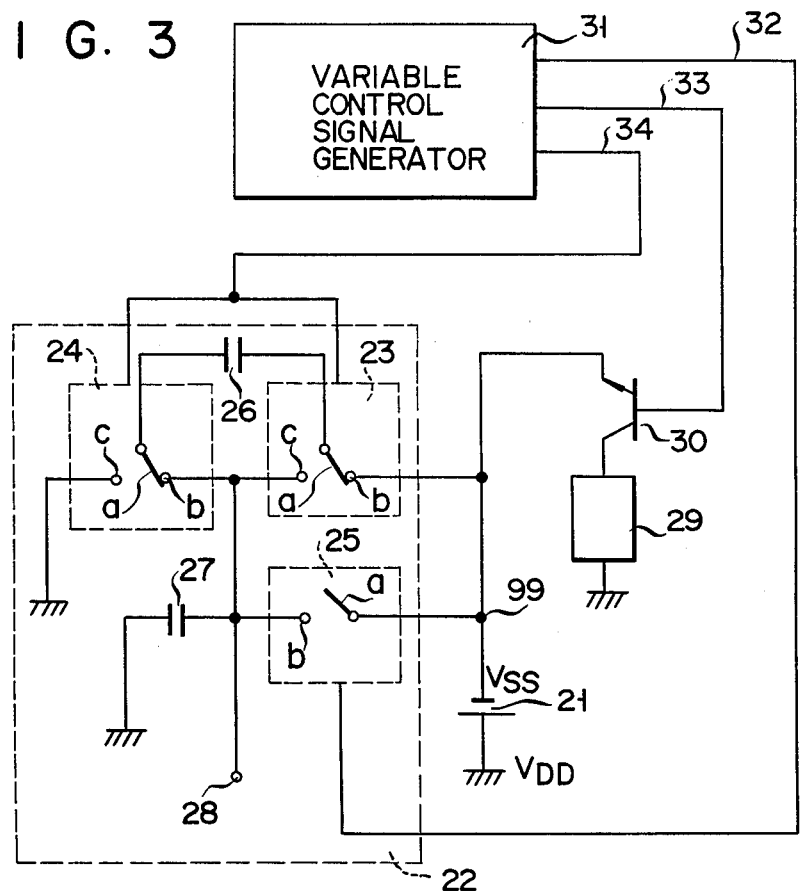
FIG. 3
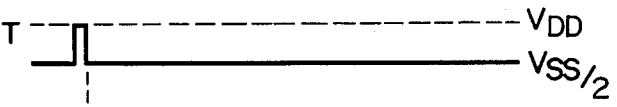
FIG. 4A $P_{ST}$
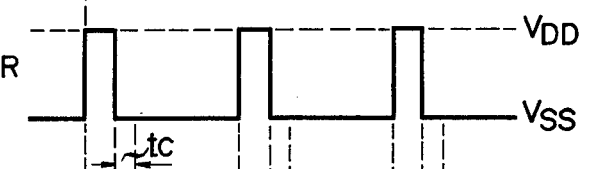
FIG. 4B $P_{TR}$
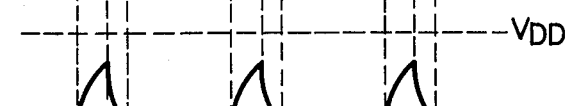
FIG. 4C 21
FIG. 4D $P_{SW}$ F I G. 5
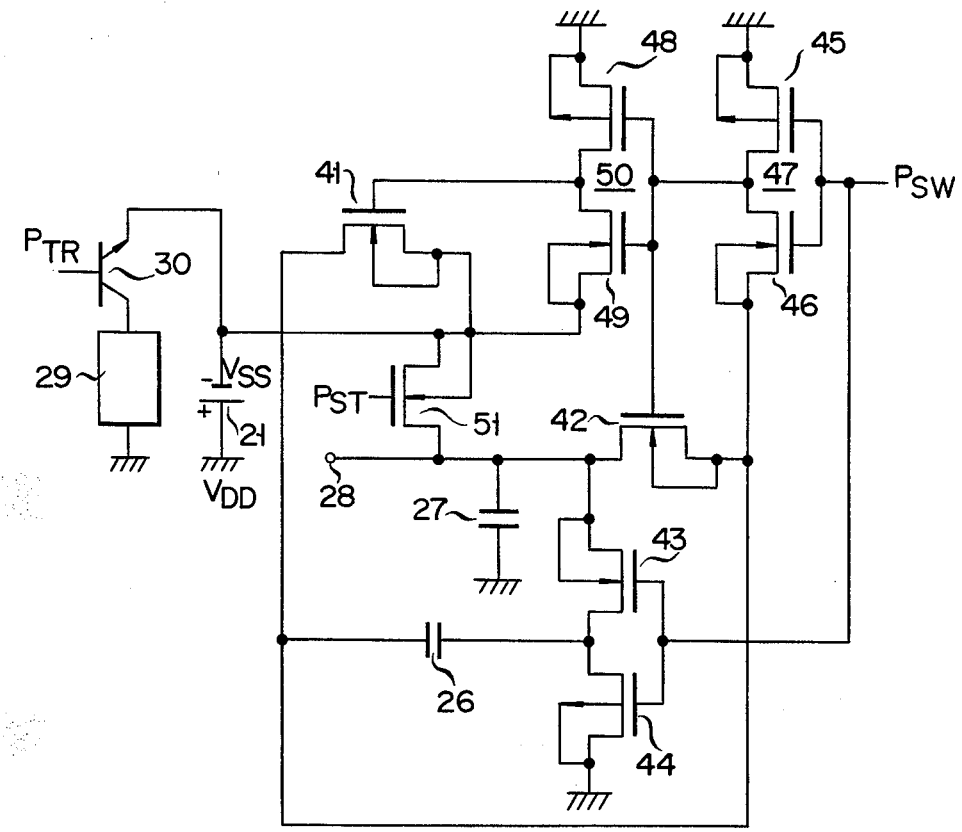

FIG. 7A  $\overline{4KHz}$  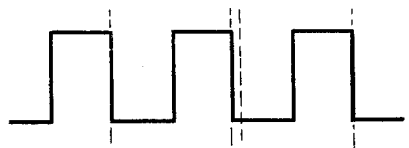
FIG. 7B  $2KHz$  
FIG. 7C  "Q" OUT  
FIG. 7D  "AND" OUT  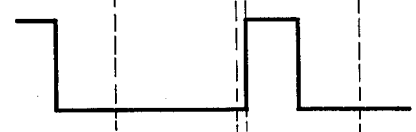

ELECTRONIC VOLTAGE DROP CIRCUIT

BACKGROUND OF THE INVENTION

The present invention relates to an electronic circuit of the type in which a load circuit is driven by a battery and a voltage drop circuit provides a dropped voltage.

In an electronic circuit using a battery as a drive source, such as an electronic timepiece, a liquid crystal display device with small power consumption for reducing power consumption has been normally used. Further, to reduce the number of the output terminals as much as possible for making the circuit well adaptable for LSI fabrication, a multiplex display system is frequently employed. At least three voltages are required for the multiplex display system. For this reason, a conventional electronic timepiece using a battery for the drive source is provided with a voltage drop circuit or a voltage raising circuit.

In a conventional electronic timepiece with a voltage drop circuit 2, as shown in FIG. 1, the voltage drop circuit 2 produces an output voltage $V_{SS}/2$ at the output terminal 8 by halving the voltage $V_{SS}$ of the battery 1. The voltage drop circuit 2 is generally called "voltage halves". With the circuit arrangement, three voltages are supplied: $V_{SS}/2$ from the voltage drop circuit 2, a reference potential, $V_{DD}$ as a ground potential, and the battery voltage $V_{SS}$.

As shown in FIG. 1, the voltage drop circuit 2 includes select switches 3 and 4 each having a movable contact a and stationary contacts b and c, a switch 5 having a movable contact a and a stationary contact b, and capacitors 6 and 7 with equal capacitances. The positive electrode of the battery 1 is coupled to the ground potential $V_{DD}$ and its negative electrode at the potential $V_{SS}$ is connected to the stationary contact b of the select switch 3. The movable contact a of the switch 3 is connected to one end of the capacitor 6 of which the other end is connected to the movable contact a of the switch 4. The stationary contact c of the switch 3 and the stationary contact b of the switch 4 are connected to the output terminal 8. The capacitor 7 is connected between the output terminal 8 and the ground. The stationary contact c of the switch 4 is connected to ground potential point. The movable contact a of the switch 5 is connected to the negative electrode of the battery 1, and its stationary contact b is connected to the output terminal 8.

The electronic timepiece is provided with a load circuit, for example, a buzzer 9 for alarm. The buzzer 9 is connected at one end to the negative electrode of the battery, through an NPN switch transistor 10 serving as a power source switch. When the transistor 10 is ON, electrical power is fed from the battery 1 to the buzzer 9. The other end of the buzzer 9 is connected to the ground potential.

A constant frequency divider 11 in FIG. 1 is connected to the select switches 3 and 4 and the switch transistor 10, and produces switch control signals for controlling the switch operations of these switches 3, 4, and 10. A control signal generator 12 is connected to the switch 5 and produces a switch control signal for controlling the operation of the switch 5.

With such a construction, the switch 5 responds to a control signal generated from the control signal generator 12 (through an operator's external operation) for turning on the switch 5 which is turned on only when the voltage drop circuit 2 starts to operate. The switches 3 and 4 are repeatedly switched in a synchronous manner by the switch control signal at a frequency of 256 Hz generated from the constant frequency divider 11. When the stationary contact a of the switch 3 is set to the stationary contact b, the movable contact a of the switch 4 is also set to the stationary contact b. Similarly, when the movable contact a of the switch 3 is turned to the stationary contact c, the movable contact a of the switch 4 is turned to the stationary contact c.

When the movable contacts a of the switches 3 and 4 are connected to the stationary contacts b, the two capacitors 6 and 7 are connected in series across the battery 1. Since the capacitances of the capacitors 6 and 7 are normally selected to be equal to each other, these capacitors are charged up to ½ voltage of the battery voltage $V_{SS}$, so long as the voltage $V_{SS}$ of the battery 1 is kept constant. Accordingly, the voltage $V_{SS}/2$ is derived from the output terminal 8.

When the switches 3 and 4 are turned from the movable contacts a to the contacts c, the two capacitors 6 and 7 are separated from the battery 1, so that they are connected in parallel between the output terminal 8 and ground. In this switching state of these switches, the charges stored in capacitors 6 and 7 when switches 3 and 4 were in the previous switching state are taken out from the output terminal 8 in the form of an output voltage.

The switching operation of the switches 3 and 4 is repeated at a high speed determined by 256 Hz frequency off the control signal. Therefore, the amount of charge discharged is very small and the potential at the output terminal 8 little changes. Thus, the voltage $V_{SS}/2$ at the output terminal 8 is almost constant, so long as the capacitors 6 and 7 are charged at the voltage $V_{SS}/2$. In this way, the prior electronic circuit can provide three voltages the: $V_{SS}/2$, $V_{SS}$, and $V_{DD}$.

For sounding the buzzer 9, responding to an external operation by an operator, the constant frequency divider 11 generates a drive control signal of 2,048 Hz frequency which in turn is applied to the base of the switch transistor 10. The transistor 10 is driven at 2,048 Hz frequency of the drive control signal to allow the voltage $V_{SS}$ to be applied to the buzzer 9. The result is the sounding of the buzzer 9 at the 2,048 Hz frequency of the drive control signal from the constant frequency divider 11.

In general, the frequency within the range from 256 Hz to 1,024 Hz is used for the switch control signal for switching the switches 3 to 5, while the frequency of the drive control signal for driving the transistor 10 and the buzzer 9 is 2,048 Hz to 4,096 Hz. Thus, both the signals are different in the frequencies and further not timed to each other. Therefore, when the battery is exhausted causing it to have a large internal resistance, if the buzzer 9 as the load circuit is operated, the output voltage $V_{SS}$ greatly changes, as shown in FIG. 2A.

With the great variation of the voltage $V_{SS}$, the amount of the charge stored in the capacitors 6 and 7 is also reduced. Therefore, when the capacitors 6 and 7 are separated from the battery 1, a voltage lower than the $V_{SS}/2$ is produced at the output terminal 8. Such an unstable output voltage brings about an abnormal display operation of the timepiece. For this reason, when the prior electronic circuit of FIG. 1 is used for a timepiece, the battery, even if it has an effective amount of the battery capacity, must be discarded and replaced by a fresh one.

SUMMARY OF THE INVENTION

Accordingly, an object of the present invention is to provide an electronic circuit of the type in which a load circuit is periodically supplied with electrical power from a battery and a voltage drop circuit forms substantially half the voltage of the battery which, in a situation that the battery is exhausted, can keep constant the output voltage from the voltage drop circuit when the load circuit is driven.

According to the present invention, there is provided an electronic circuit comprising: battery means; voltage drop circuit means for dropping the output voltage of the battery to provide a dropped voltage, the voltage drop circuit means including two impedance means and switching means for selectively arranging the two impedance means in series connection to the battery means during a charge period and arranging the two impedance means in parallel connection; load means driven by the battery means; power source switching means for allowing the power supply to be intermittently supplied from the battery means to the load means; and a control means for controlling the switching means and the power source switching means so that the charge period to the two impedance means is set within the no power supply period to the charge load means.

BRIEF DESCRIPTION OF THE DRAWINGS

FIG. 1 is a circuit diagram of a prior electronic circuit assembled into a battery-driven electronic timepiece;

FIG. 2A shows a variation of an output voltage from a battery assembled into the electronic circuit shown in FIG. 1 when current is fed into a load circuit in a situation that the battery is exhausted to a certain degree;

FIG. 2B shows a waveform of a charge signal when the capacitors in the FIG. 1 circuit are charged from the battery when it is feeding current to the load circuit;

FIG. 3 is a circuit diagram of an embodiment of an electronic circuit according to the present invention;

FIG. 4A shows a waveform of a pulse signal applied to a voltage drop circuit when the voltage drop circuit in the electronic circuit shown in FIG. 3 starts to be driven;

FIG. 4B shows a waveform of a drive control signal $P_{TR}$ for controlling a switch transistor in the FIG. 3 electronic circuit;

FIG. 4C shows a waveform of a potential variation of a battery assembled into the FIG. 3 electronic circuit;

FIG. 4D shows a waveform of a switch control signal $P_{SW}$ for controlling select switches used in the FIG. 3 electronic circuit;

FIG. 5 shows a circuit diagram of the voltage drop circuit used in the FIG. 3 circuit when it is fabricated into an LSI circuit;

FIGS. 7A to 7D show a set of waveforms of signals at the key portions in the variable control signal generator shown in FIG. 6.

DETAILED DESCRIPTION OF THE PREFERRED EMBODIMENTS

Figure 6:
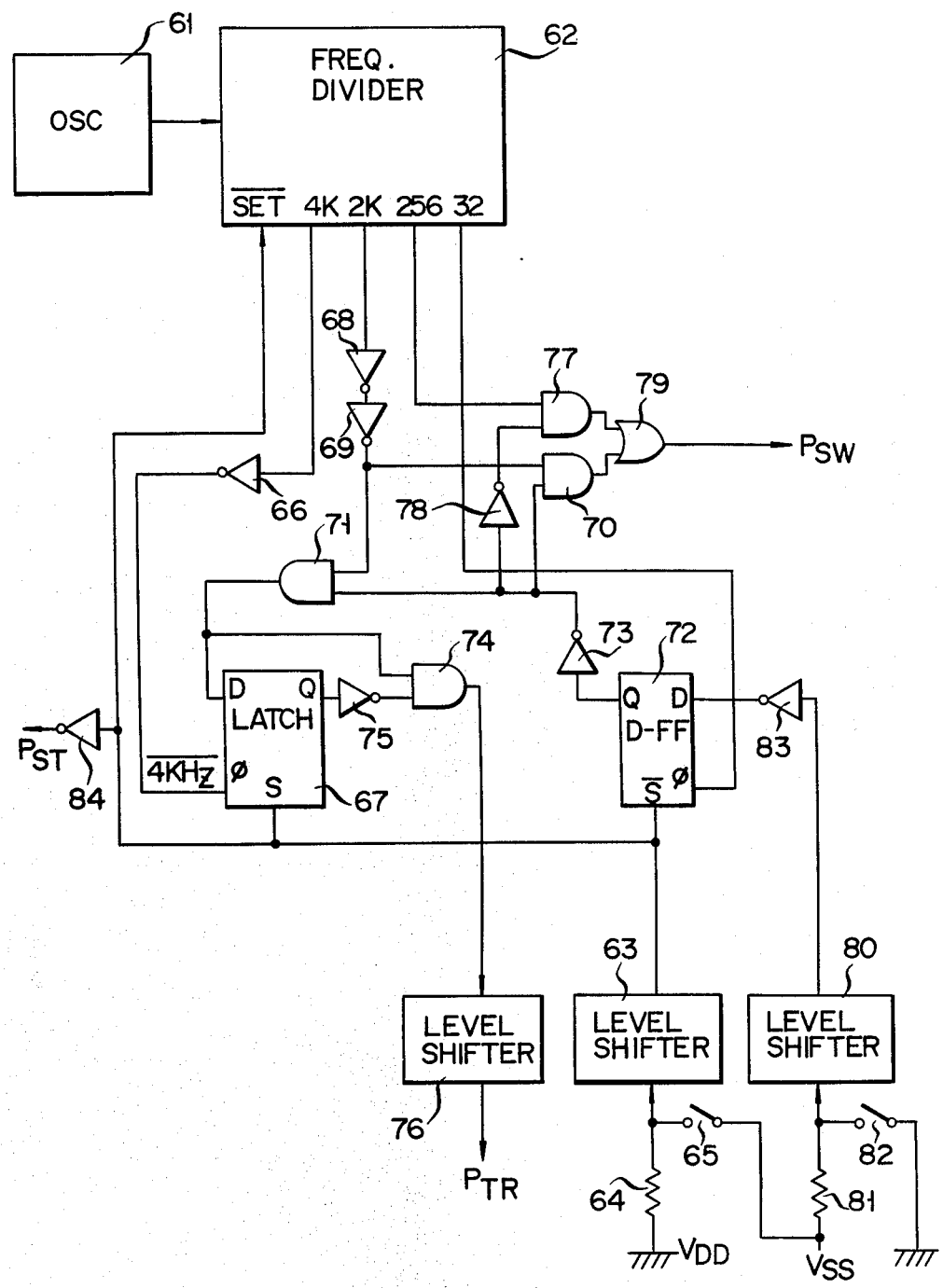
FIG. 6 shows a circuit diagram of a variable control signal generator used in the FIG. 3 electronic circuit.

Referring to FIG. 3, there is shown an electronic circuit with a battery 21 as a common power source. A voltage drop circuit 22 in the electronic circuit includes select switches 23 and 24 each of which has a single movable contact a and two stationary contacts b and c, a start switch 25 having a movable contact a and a stationary contact b connected to an output terminal 28, and two capacitors 26 and 27 with capacitances substantially equal to each other.

A positive electrode of the battery 21 is connected to a reference potential, for example, a ground potential $V_{DD}$. A negative electrode of the battery 21 for providing a voltage $V_{SS}$ is connected to the stationary contact b of the select switch 23. The capacitor 26 is connected at one end to the movable contact a of the switch 23 and at the other end to the movable contact a of the switch 24. The stationary contact c of the switch 23 and the stationary contact b of the switch 24 are both connected to the output terminal 28. The capacitor 27 is connected between the output terminal 28 and a ground potential. The stationary contact c of the switch 24 is connected to the ground potential. The switch 25 is connected at the movable contact a to the negative electrode (potential $V_{SS}$) of the battery 21 and at the stationary contact b to the output terminal 28.

The negative electrode of the battery 21 is connected to one end of a load circuit 29 as a buzzer for alarm, through a transistor 30 as a power switch. The other end of the load circuit 29 is connected to ground. The load circuit 29 operates upon supply of electrical power from the battery 21 when the transistor 30 is ON.

A variable control signal generator 31 is connected through a first control line 32 to the switch 25, and through a second control line 33 to the base of the transistor 30, and through a third control line 34 to the two switches 23 and 24. The control signal generator 31 generates a start pulse $P_{ST}$, a drive control signal $P_{TR}$, and a switch control signal $P_{SW}$, as shown in FIGS. 4A, 4B and 4D. These signals are applied through the control lines 32, 33, and 34 to the switch 25, the base of the transistor 30, and the two switches 23 and 24, respectively.

FIG. 4B illustrates a variation of a potential at the negative electrode of the battery 21 during the drive period of the buzzer as the load circuit. As seen from FIGS. 4B and 4D, the frequencies of the drive control signal $P_{TR}$ and the switch control signal $P_{SW}$ are equal to each other; and the $V_{CC}$ level duration of the switch control signal $P_{SW}$, which is the charged period for the two capacitors 26 and 27, is set within the $V_{SS}$ level duration of the drive control signal $P_{TR}$, which is a non-drive period of the load circuit 29 (no power supply period). Accordingly, the two capacitors 26 and 27 are charged within the period when the load circuit 29 is not driven, i.e., within the no power supply period.

As shown in FIG. 4C, the voltage at the negative electrode of the battery 21 gradually goes toward the $V_{DD}$ level (its absolute value gradually decreases) when the drive control signal $P_{TR}$ reaches the $V_{DD}$ level (drive level) to drive the load circuit 29. Then, when the drive control signal $P_{TR}$ changes from the $V_{DD}$ level toward the $V_{SS}$ level (non-drive level), it goes back to the $V_{SS}$ level. A state of its return to the $V_{SS}$ level in FIG. 4C indicates a state that the potential of the battery 21 restores to its original potential state. A restoration period $t_c$ is taken for the potential of the battery 21 to return to the $V_{SS}$ level, after the drive control signal $P_{TR}$ instantaneously shifts to the $V_{SS}$ level. That is, the $V_{DD}$ level period of the switch control signal $P_{SW}$ continues for the period $t_c$ after the $V_{DD}$ level period of the drive control signal $P_{TR}$ terminates and the signal $P_{TR}$ shifts from the $V_{DD}$ level to the $V_{SS}$ level. Accordingly, the switch control signal $P_{SW}$ is kept at the $V_{DD}$ level until the voltage of the battery 21 is restored to the $V_{SS}$ level. As shown in FIG. 4D, the $V_{DD}$ level period for switch control signal $P_{SN}$ is kept after the drive control signal $P_{TR}$ shifts from the $V_{DD}$ level to the $V_{SS}$ level and the $V_{SS}$ level period $t_c$ terminates, and then abruptly falls off to the $V_{SS}$ level.

The operation of the electronic circuit of FIG. 3 will be described in detail. To start, an operator does some external operation for driving the voltage drop circuit 22 to drive the control signal generator 31. Upon the operator's operation, the control signal generator 31 produces a start pulse of one shot $P_{ST}$ as shown in FIG. 4A to the switch 25 through the line 32. Then, the switch 25 is turned on during the duration of the start pulse. Next, the switches 23 and 24 respond to the switch control signal $P_{SW}$ coming from the signal generator 31 to repeatedly be switched to the same switch position. At the same time, the transistor 30 is repeatedly turned on and off by the drive control signal $P_{TR}$, as shown in FIG. 4B, delivered from the control signal generator 31.

It is assumed that the switch control signal $P_{SW}$ changes from the $V_{CC}$ level to the $V_{DD}$ level. In this case, the movable contact a of each of the switches 23 and 24 is switched from the stationary contact b to the contact c, and the capacitors 26 and 27 are separated from the battery 21 and form a parallel circuit between the output terminal 28 and the ground. Under this condition, an output voltage appears at the output terminal 28, which is caused by the charge stored in the capacitors 26 and 27 before the movable contacts a of the switches 23 and 24 were switched to the stationary contacts c, i.e. a period that these are connected to the stationary contact b.

The drive control signal $P_{TR}$ is at the $V_{DD}$ level when the switch control signal $P_{SW}$ is at the $V_{DD}$ level, so that the transistor 30 is turned on. Incidentally, in the present embodiment, the level shift of the signals $P_{SW}$ and $P_{TR}$ to the $V_{DD}$ level are synchronized with each other. As the result of the turning on of the transistor 30, the buzzer 29 is fed with power from the battery 21 to sound. During the drive period of the buzzer 29 or the $V_{DD}$ level period of the drive control signal $P_{TR}$, a large load current flows into the buzzer 29, so that the potential at the negative electrode of the battery 21 gradually changes from the $V_{SS}$ level to the $V_{DD}$ level (its absolute value gradually decreases).

During the drive period of the buzzer 29, the movable contacts a of the switches 23 and 24 are connected to the stationary contacts c and the voltage drop circuit 22 is separated from the battery 21. Accordingly, the output voltage at the output terminal is caused by the charge previously stored in the capacitors 26 and 27. Accordingly, even if the voltage of the battery 21 changes from the $V_{SS}$ level to the $V_{DD}$ level, the output terminal 28 provides a substantially constant voltage. In the circuit, when the capacitances of the capacitors 26 and 27 are equal to each other, the charge stored in the capacitors correspond to about $\frac{1}{2} \times V_{SS}$, and hence the output voltage from the output terminal 28 is substantially equal to the $V_{SS}/2$.

As described above, when the $V_{DD}$ level period of the drive control signal $P_{TR}$ terminates and shifts to the $V_{SS}$, the potential of the battery 21 restores to the $V_{SS}$ level. In this case, it goes to the $V_{SS}$ level not instantaneously but gradually for a restoration time $t_c$. See FIGS. 4B and 4C. Thus, the switch control signal $P_{SW}$ is kept at the $V_{DD}$ level for at least the restoration time $t_c$ after the drive control signal $P_{TR}$ shifts to the $V_{SS}$ level, and then it instantaneously falls off to the $V_{CC}$ (about $V_{SS}/2$), as described above and shown in FIG. 4D.

When the switch control signal $P_{SW}$ shifts to the $V_{CC}$ level, the movable contacts a of the switches 23 and 24 are switched from the stationary contacts c to the stationary contacts b. Under this condition, the two capacitors 26 and 27 are connected in series to the battery 21 and are charged with the stable voltage $V_{SS}$ from the battery 21. During this period, that is, a period that the switch control signal $P_{SW}$ is at the $V_{DD}$ level, a stable output voltage is produced from the output terminal 28. As described above, these capacitors are selected to have the equal capacitances. Accordingly, the output voltage produced from the output terminal 28 is about $V_{SS}/2$. Thus, since the capacitors 26 and 27 are charged with the stable voltage $V_{SS}/2$ during this period that the switch control signal $P_{SW}$ is at $V_{CC}$ level, the stable output voltage can be produced at the output terminal 28 when the switch control signal $P_{SW}$ is changed to enter the $V_{DD}$ level period.

As described above, the charge to the capacitors 26 and 27 is performed during the non-drive period of the load circuit 29. In other words, the charge period to the capacitors 26 and 27 is set within the non-drive period of the load circuit 29. Thus, the capacitors 26 and 27 are charged with the stable voltage from the battery 21. Therefore, even if the battery 21 is exhausted and its voltage instably changes when the load circuit 29 is driven, the output voltage at the output terminal 28 of the voltage drop circuit 22 little changes.

Turning now to FIG. 5, there is shown the voltage drop circuit 22 in the electronic circuit shown in FIG. 3 when it is fabricated into an LSI circuit, using MOS (metal oxide semiconductor) transistors. N-channel MOS transistors 41 and 42 make up the switch 23 and an N-channel MOS transistor 43 and a P-channel MOS transistor 44 make up the switch 24. A P-channel MOS transistor 45 and an N-channel MOS transistor 46 constitute a complementary MOS (CMOS) inverter 47. A P-channel MOS transistor 48 and an N-channel MOS transistor 49 also constitute a CMOS inverter 50. The CMOS inverters 47 and 50 form the switch 23 to control the MOS transistors 41 and 42.

The MOS transistors 43 and 44 forming the switch 24 are directly controlled by the switch control signal $P_{SW}$. An N-channel MOS transistor 51 constituting the switch 25 in FIG. 3 is turned on only when the voltage drop circuit 22 starts to operate responding to the start control signal $P_{ST}$.

To illustrate the interconnection of these elements, the two transistors 45 and 46 forming the inverter 47 are connected such that their sources are connected to the substrate and their gates are interconnected. The source of the MOS transistor 45 is coupled with the reference potential $V_{DD}$. The drain of the MOS transistor 45 and the drain of the MOS transistor 46 are interconnected. The source of the MOS transistor 46 is connected to the drain of the MOS transistor 42 and one end of the capacitor 26, and to the drain of the MOS transistor 41 forming the switch 23.

The two transistors 48 and 49 forming the CMOS inverter 50 are connected at the sources to the substrate. The gates of the MOS transistors 48 and 49 are interconnected and connected to a junction between the drain of the MOS transistor 45 and the drain of the MOS transistor 46. The source of the MOS transistor 48 is connected to the reference potential $V_{DD}$. The drains of the MOS transistors 48 and 49 are interconnected. The source of the MOS transistor 49 is connected to the sources of the MOS transistors 41 and 51 and the negative electrode of the battery 21 for providing the potential $V_{SS}$. The gates of the MOS transistors 48 and 49 are also connected to the gate of the MOS transistor 42.

The source of the MOS transistor 42 is connected to the source of the MOS transistor 43, one end of the capacitor 27, the drain of the MOS transistor 51, and the output terminal 28 of the voltage drop circuit 22. The gates of the MOS transistors 43 and 44 forming the switch 24 are interconnected and connected to the switch control terminal of the control signal generator 31 (not illustrated). The drain of the MOS transistor 43 is connected to the drain of the MOS transistor 44 and to the other end of the capacitor 26. The source of the MOS transistor 44 is connected to the reference potential $V_{DD}$. The MOS transistors 43 and 44 are both connected at the sources to the substrate.

The sources of the MOS transistors 41, 51, and 42 are connected to the substrate. The other end of the capacitor 27 which is opposite to the end connected to the output terminal 27 is coupled with the reference potential $V_{DD}$.

The operation of the voltage drop circuit 22 thus constructed will be described.

The start control signal $P_{ST}$(FIG. 4A) is applied from the control signal generator 31 to the gate of the MOS transistor 51, so that the MOS transistor 51 is turned on for a very short period. Then, the output terminal 28 is coupled to the potential $V_{SS}$. At the start of the operation of the voltage drop circuit 22, the switch control signal $P_{SW}$ from the control signal generator 31 is set at the $V_{CC}$ level, so that the MOS transistors 45, 49, 42, and 44 are turned on.

Under this condition, the movable contacts a of the two switches 23 and 24 in the FIG. 3 circuit are turned to the stationary contacts c. That is to say, the capacitors 26 and 27 are separated from the battery 21 to form a parallel connection and are charged with the potential $V_{SS}$. In this way, after the initial state is set up, the switch control signal $P_{SW}$ changes alternately between the $V_{DD}$ level and the $V_{SS}$ level. As a result, the MOS transistors 41 and 42 forming the switch 23 are alternately ON and OFF, and at the same time the MOS transistors 13 and 14 forming the switch 24 is alternately ON and OFF. As a result, the voltage of about $V_{SS}/2$ appears at the output terminal 28.

FIG. 6 shows a circuit diagram of the variable control signal generator 31. The control signal generator 31 is so designed that the switches 23 and 24 in the voltage drop circuit 22 are switched at 256 Hz when the load circuit 29 is not driven and are switched at 2,048 Hz when it is driven. An oscillator 61 is a crystal oscillator using a crystal resonator to oscillate a stable clock pulse signal at 32 kHz. The oscillator 61 is connected to the input terminal of a frequency divider 62 having a SET terminal, 4 and 2 kHz pulse output terminals, and 256 and 32 Hz terminals.

The SET input terminal of the frequency divider 62 is connected to the output terminal of a level shifter 63. The input terminal of the level shifter 63 is coupled with the reference potential $V_{DD}$ as a ground potential via a resistor 64. The input terminal of the level shifter 63 is also coupled with the potential $V_{SS}$ via a switch 65.

The 4 kHz terminal of the frequency divider 62 is connected to a $\phi$ terminal of a latch circuit 67 through an inverter 66. The 2 kHz terminal is connected to one of the input terminals of each of AND gates 70 and 71, through two inverters 68 and 69. A Q output terminal of a dynamic flip-flop D-FF 72 is connected through an inverter 73 to the other input terminals of gates 70 and 71.

The output terminal of the AND gate 71 is connected to the D input terminal of the latch circuit 67 and is connected to one of the input terminals of an AND gate 74. The Q output terminal of the latch circuit 67 is connected to the other input terminal of the AND gate 74 through an inverter 75. The output terminal of the AND gate 74 is connected to the input terminal of the level shifter 76, and the output terminal of the level shifter 76 is connected as a drive control signal ($P_{TR}$) output terminal to the base of the transistor 30 in FIGS. 3 and 5.

The 256 Hz pulse output terminal of the frequency divider 62 is connected to one of the input terminals of the AND gate 77 of which the other input terminal is connected to the Q output terminal of the D-FF 72 via the inverters 73 and 78. The other input terminal of the AND gate 70 is connected to the Q output terminal of the flip-flop 72 by way of the inverter 73. The output terminal of the AND gate 77 is connected to one of the input terminal of an OR gate 79 of which the other input terminal is connected to the output terminal of the AND gate 70. The output terminal of the OR gate 79 is connected as a switch control signal ($P_{SW}$) output terminal to the switches 23 and 24 shown in FIG. 3, and in FIG. 5 to the gates of the transistors 45 and 46 forming the inverter 47 and to the gates of the two MOS transistors 43 and 44 forming the switch 24.

The 32 Hz output terminal of the frequency divider 62 is connected to the $\phi$ input terminal of the D-FF 72. The input terminal of a level shifter 80 is connected through a resistor 81 to the potential $V_{SS}$. The input terminal of the level shifter 80 is coupled through a load drive switch 82 to the potential $V_{DD}$. The level shifter 80 is connected at its output terminal to the D input terminal of the dynamic flip-flop D-FF 72, through an inverter 83.

The output terminal of the level shifter 63 is connected to the S input terminals of the D-FF 72 and the latch circuit 67. The level shifter 63 is also connected at its output terminal to the input terminal of the inverter 84. The output terminal of the inverter 84 is connected as a start pulse ($P_{ST}$) output terminal to the start switch 25 in FIG. 3 and to the gate of the MOS transistor 51 in FIG. 5.

With such an arrangement, the control signal generator produces a clock pulse signal at a stable frequency of 32 kHz, for example, from the crystal oscillator 61. The frequency divider 62 responds to the output signal from the oscillator 61 to provide pulse signals at 4 kHz, 2 kHz, 256 Hz, and 32 Hz. The 256 Hz signal is used as a switch control signal $P_{SW}$ for the voltage drop circuit 22 when the load circuit 29 (FIGS. 3 and 5) is not driven. The 2 kHz signal is used as a switch control signal $P_{SW}$ for the circuit 22 when the load circuit 29 is driven and is also used as the drive control signal $P_{TR}$ to the switch transistor 30 for controlling the drive of the load circuit 29, when its width is narrowed.

The 32 Hz signal is inputted to the $\phi$ input terminal of the D-FF 72 to prevent the chattering when the load drive switch 82 is turned on. The level shifter 63 level-shifts the potential $V_{SS}$ of the battery 21 to $V_{SS}/2$, and the level shifter 76 level-shifts the output signal of $V_{SS}/2$ from the AND gate 74 to the $V_{SS}$ potential. When the start switch 65 is OFF, the output level of the level shifter 63 is at $V_{DD}$ and when it is turned on, its input terminal is coupled to the potential $V_{SS}$, and hence its output level is $V_{SS}/2$.

When the load drive switch 82 is OFF, the output level of the level shifter 80 is at $V_{SS}/2$; and when it is ON, its input terminal is coupled to the potential $V_{DD}$, and its output level is $V_{DD}$. The frequencies of the signals at the 32 kHz, 4 kHz, and 2 kHz terminals are precisely 32,768 Hz, 4,096 Hz, and 2,048 Hz, respectively.

The operation of such circuit will be described. It is assumed that the start switch 65 and the load drive switch 82 are both OFF.

For driving the voltage drop circuit 22, only when the start switch is turned on, it is instantaneously turned on to connect the input terminal of the level shifter 63 to the potential $V_{SS}$. The $V_{SS}/2$ is applied as an input signal to the S terminal of the D-FF 72 and the SET terminal of the frequency divider 62. The $V_{SS}/2$ output signal from the level shifter 63 is phase-inverted by the inverter 84 and is inputted as the start control signal $P_{ST}$ to the base of the transistor 30 of the voltage drop circuit 22 and the gate of the MOS transistor 51 in FIG. 5.

The 256 Hz output pulse signal from the frequency divider 62 is connected to one of the input terminals of the AND gate 77. The other input terminal of the AND gate 77 is supplied with the Q output signal from the Q terminal of the D-FF 72, by way of the inverters 73 and 78. At this time, since the load circuit drive switch 82 has been OFF, the input terminal of the level shifter 80 is connected to the potential $V_{SS}$ through the resistor 81. In this case, the Q signal of the D-FF is set at "1" level. The "1" level Q signal is applied through the two inverters 73 and 78 to the other input terminal of the AND gate 77 so that the Q signal at "1" level is inputted to the other input terminal. Accordingly, the AND gate 77 is enabled to allow the 256 Hz signal to pass therethrough. The 256 Hz pulse signal is applied as the switch control signal $P_{SW}$ through the OR gate 79 to the voltage drop circuit 22 (FIGS. 3 and 5).

For driving the load circuit, the load drive switch 82 is turned on so that the input terminal of the level shifter 63 is connected to the potential $V_{DD}$. As a result, the output level of the level shifter 80 changes from the $V_{SS}/2$ to $V_{DD}$. The output signal of the $V_{DD}$ from the level shifter 80 is applied through the inverter 83 to the D terminal of the D-FF 72 so that the phase of the Q input signal of the D-FF 72 is inverted to be "0" level signal. Therefore, the 256 Hz signal from the AND gate 77 disappears. The "0" level output signal is applied as a "1" level signal through the inverter 73 to the other input terminal of the AND gate 70.

The 2 kHz signal from the frequency divider 62 is applied to the input terminal of the AND gate 70 through the two inverters 68 and 69. The pulse signal at 2 kHz is then produced from the AND gate 70. This signal is applied as the switch drive signal $P_{SW}$ to the voltage drop circuit 22 through the OR gate 79. The 2 kHz output pulse from the frequency divider 62 is applied to one of the input terminals of the AND gate 71 through the inverters 68 and 69. Since the Q output signal from the dynamic flip-flop 72 is applied through the inverter 73 to the other input terminal of the AND gate 71, the AND gate 71 is enabled to allow the 2 kHz output signal to pass therethrough. The 2 kHz signal is applied to the input terminal of the AND gate 74 and to the D terminal of the latch circuit 67.

The 4 kHz signal from the frequency divider is applied through the inverter 66 to the $\phi$ input terminal of the latch circuit 67. The 2 kHz signal is behind the 4 kHz signal by a time Td, as shown in FIGS. 7A and 7B. The Q output signal from the latch circuit 67 has a waveform delayed by ¼ period behind the 2 kHz signal, as shown in FIGS. 7B and 7C, and changes at the leading edge of the 4 kHz pulse. The Q output signal is applied to the other input terminal of the AND gate 74 through the inverter 45. Accordingly, the AND gate 74 produces the signal as shown in FIG. 7D.

The output signal is changed from the $V_{SS}/2$ to the $V_{SS}$ through the level shifter 76 and is applied as the drive control signal $P_{TR}$ to the base of the switch transistor 30 shown in FIGS. 3 and 5.

A comparison of the signals in FIGS. 7B and 7D show that the "0" level period of the switch control signal (FIG. 7B) is within the "0" level period of the drive control signal (FIG. 7D). The charge period to the capacitors 26 and 27 in the circuit of FIG. 5 is set within the non-drive period or the no power supply period of the load circuit 29. The output signal of 32 Hz from the frequency divider 62 is applied to the $\phi$ terminal of the D-FF 72, as a signal for preventing chattering due to the ON operation of the load drive switch 82.

Figure 8:
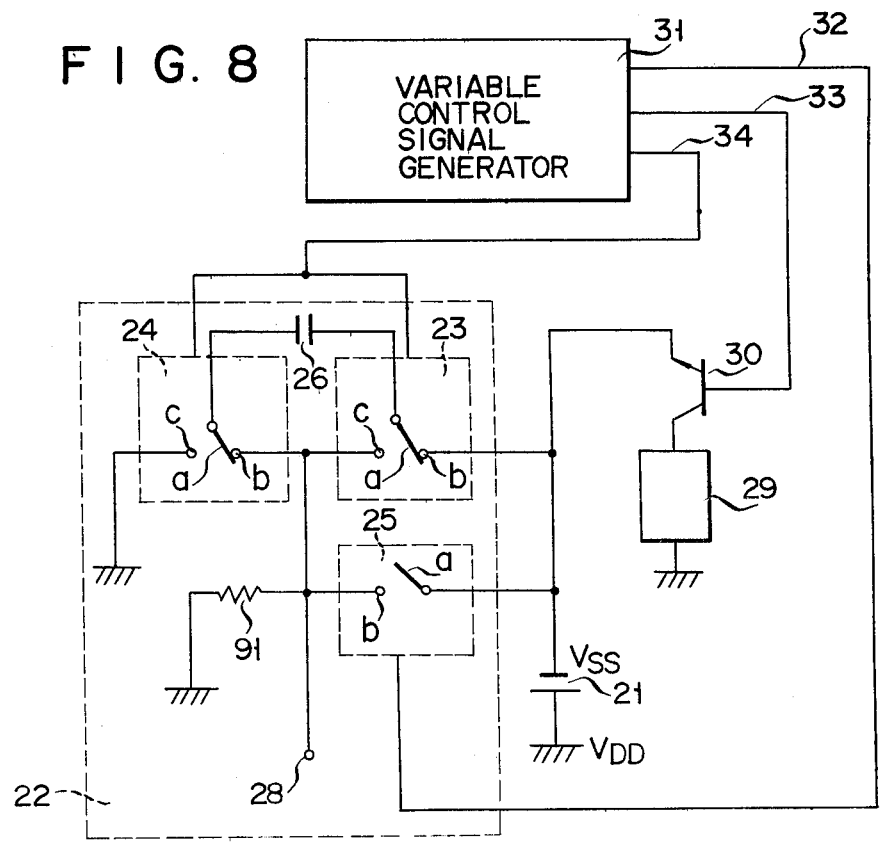
FIG. 8 is a circuit diagram of another embodiment of an electronic circuit according to the present invention.

FIG. 8 shows another embodiment of an electronic circuit according to the present invention. The circuit arrangement of the present embodiment is the same as that of the FIG. 3 embodiment except that the capacitor 27 in the voltage drop circuit is replaced by a resistor 91. In the embodiment, like numerals are used for designating like portions in FIG. 3. The present embodiment also can attain the same effect as that of the FIG. 3 embodiment, i.e., when the battery is exhausted, a stable output voltage can be obtained at the output terminal 28 of the voltage drop circuit 22.

In the above-mentioned embodiments, the buzzer is used for the load circuit. This may be replaced by another means if it is driven by the battery power supplied through the transistor 30 as the switching element. The capacitances of the two capacitors may be different from each other. This is true for the frequencies of the switch control signal $P_{SW}$ and the drive control signal $P_{TR}$, if the charge period to the capacitors 26 and 27 in FIG. 3 or the capacitor 26 and the resistor 91 in FIG. 8 is within the non-drive period of the load circuit. Further, the shift of the drive control signal $P_{TR}$ to the $V_{DD}$ level may be behind the shift of the switch control signal $P_{SW}$ to the $V_{DD}$ level.

As described above, in the electronic circuit according to the present invention, the charge period to the two capacitors is within the non-drive period of the load circuit. The capacitors can be charged with the stable voltage of the battery. Accordingly, when the battery is exhausted and the output potential of the battery changes due to the drive of the load circuit, the output voltage at the output terminal is stable.

This invention may also be applied to a voltage raising circuit such as a voltage doubler which produces an output voltage two times higher than that of the battery. In such a case, the battery 21 and the capacitor 27 are interchanged with each other, the base of the transistor 30 is connected to the terminal 28, and the output voltage is taken from a circuit point 99 in the FIG. 3 circuit. The voltage raising circuit to which this invention is applied produces a stable output voltage.

While having been described using specific embodiments, the present invention may variously be modified or changed within the scope of the present invention.

What we claim is:

1. An electronic circuit comprising:
   battery means;
   voltage drop circuit means for dropping the output voltage of said battery means to provide a dropped voltage, said voltage drop circuit means including two impedance means and switching means for selectively arranging said two impedance means in series connection to said battery means during a charge period and for arranging said two impedance means in parallel connection;
   load means driven by said battery means;
   power source switching means for allowing the power supply to be intermittently supplied from said battery means to said load means; and
   control means for controlling said switching means and said power source switching means for setting the charge period to said two impedance means within the no power supply period to said charge load means by producing a drive control pulse signal applied to said power source switching means and alternately changing the signal level between a drive level to said load means and a non-drive level, and by producing a switch control pulse signal applied to said switching means and having a charge level during the non-drive period of said drive control pulse signal.

2. An electronic circuit according to claim 1, in which said two impedance means are capacitor means.

3. An electronic circuit according to claim 2, in which the capacitances of said two capacitors are substantially equal to each other.

4. An electronic circuit according to claim 2, in which the capacitances of said two capacitor means are different from each other.

5. An electronic circuit according to claim 1, in which said two impedance means includes a capacitor means coupled with the dropped potential of said battery means and a resistor means coupled with the reference potential when said capacitor means are connected in series to said battery means.

6. An electronic circuit according to claim 1, in which said voltage drop circuit means is further provided with switch means for interrupting the connection between said output terminal and said battery means, and said control means further produces a start pulse signal applied to said voltage drop circuit means and is at ON level only when said voltage drop circuit means starts to be driven.

* * * * *